No. 711,102. Patented Oct. 14, 1902.
A. D. FOOTE.
ROCK DRILL.
(Application filed Mar. 17, 1902.)
(No Model.)
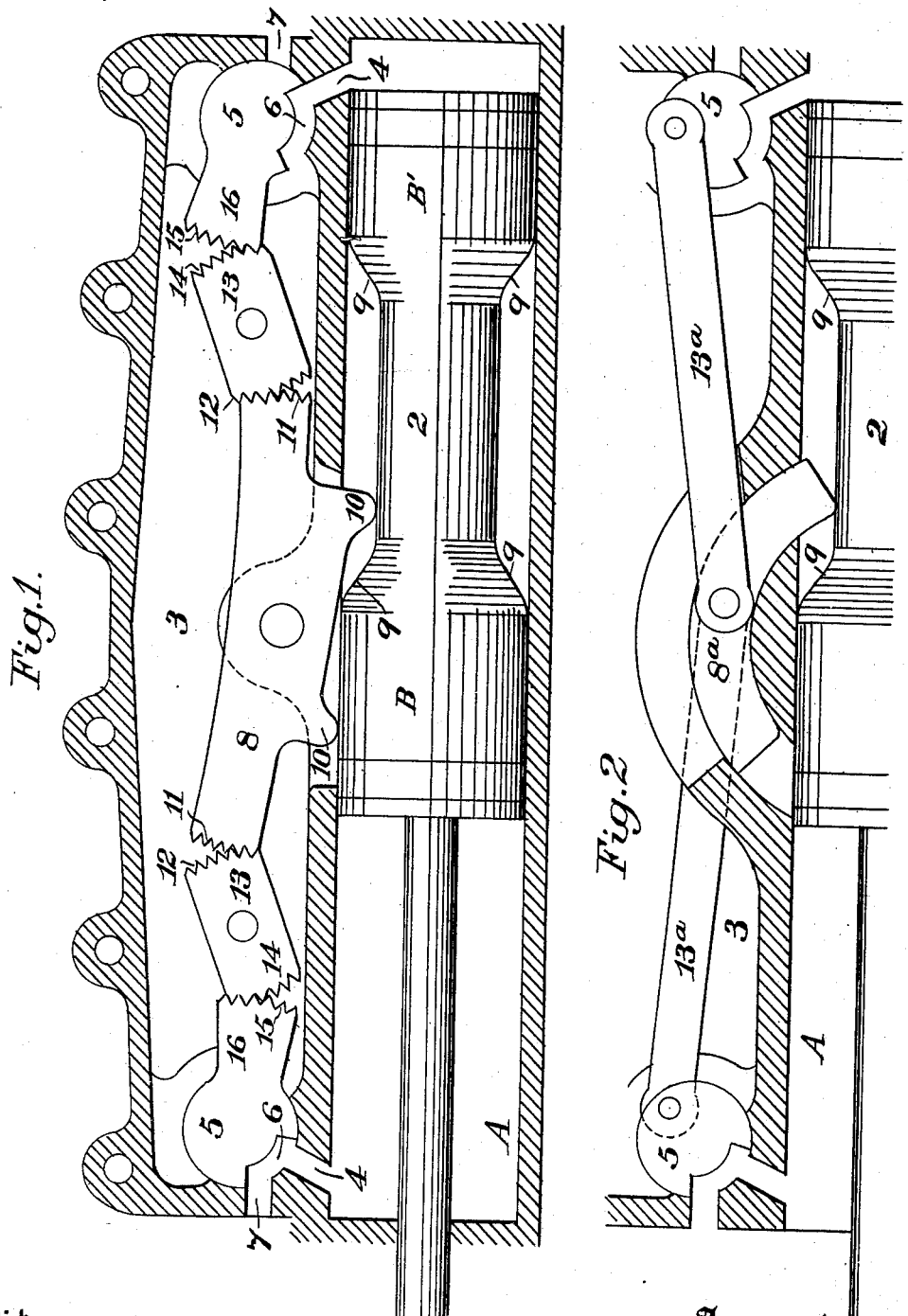

UNITED STATES PATENT OFFICE.

ARTHUR D. FOOTE, OF GRASS VALLEY, CALIFORNIA.

ROCK-DRILL.

SPECIFICATION forming part of Letters Patent No. 711,102, dated October 14, 1902.

Application filed March 17, 1902. Serial No. 98,500. (No model.)

*To all whom it may concern:*

Be it known that I, ARTHUR D. FOOTE, a citizen of the United States, residing at Grass Valley, county of Nevada, State of California, have invented an Improvement in Rock-Drills; and I hereby declare the following to be a full, clear, and exact description of the same.

My invention relates to improvements in rock-drills, and especially in a means for impelling said drills by the action of an elastic medium under pressure.

My invention consists in a novel arrangement of inlet and exhaust valves located close to the ends of the cylinder in which the piston of the drill reciprocates and a means for opening and closing said valves by the movement of the piston transmitted directly to the valves and without exterior mechanism.

It also comprises details of construction, which will be more fully explained by reference to the accompanying drawings, in which—

Figure 1 is a view illustrating one form of mechanism. Fig. 2 is a modification operated in essentially the same manner.

In the operation of rock-drills and like apparatus depending upon a piston reciprocated within a cylinder by air or equivalent elastic medium under pressure considerable loss of power is sustained when the valves are so located that the elastic medium must pass through ports of considerable length between the valve and the cylinder, and the rapidity and force of the blows are very much reduced by this loss.

It is the object of my invention to overcome this difficulty, to increase the efficiency of the drill by locating the valves as close as possible to the ends of the cylinder, and to provide a means actuated by the movements of the piston with direct connections between the piston and the valves, whereby they are operated in unison to alternately supply the pressure and exhaust.

As shown in the present construction, A represents the cylinder with suitable mountings, whereby it may be placed in line with the proposed hole to be drilled in the rock. Within this cylinder a piston formed with heads B B' and an intermediate connecting-stem 2 of smaller diameter is adapted to reciprocate, and this reciprocating piston is designed to carry and impel the shank of the drill, which extends in line with the piston and exterior to the cylinder.

3 is a steam-chest or the valve-chamber extending the full length of the cylinder and having short ports 4, leading directly into the ends of the cylinder.

5 represents rotary oscillating valves having ports 6 formed in them in such a manner that when turned in one direction these ports connect the cylinder-port 4 with the interior of the valve-chamber, so as to admit the compressed air or other elastic medium directly into the cylinder behind the piston at that end, so as to impel it to the opposite end of its stroke. At the same time the opposite valve 5 will be turned so that its port 6 forms a communication between the cylinder-port 4 at that end and the exhaust-port 7, thus allowing the elastic medium to escape from that end of the cylinder while the piston is being moved in that direction. In order to operate these valves properly and in unison, I have shown a rocker-arm, as 8, located within the steam-chest in such position that the reciprocations of the piston will cause the inclines 9 at the inner sides of the piston-heads B B' to alternately contact with the portions 10 of this rocking arm which project into the cylinder where the piston reciprocates and between the heads B and B', so that the packing-rings of these heads will prevent any escape of the elastic medium into the ends of the cylinder, and as the pressure in each direction against the surfaces 9 is equal it will be balanced and not interfere with the operation of the piston when the unbalanced pressures are alternately applied to the outer ends thereof.

In Fig. 1 I have shown the device 8 as being centrally fulcrumed and having the ends formed with teeth, as at 11. These teeth intermesh with corresponding teeth 12 upon a short centrally-fulcrumed lever or section 13, the outer end of which is also provided with teeth 14, and these teeth intermesh with teeth 15 on the end of a lever-arm 16, which projects from the valve 5. In this manner the oscillations of the tilting section 8 are transmitted to alternately open and close the valves 5, as previously described.

In Fig. 2 I have shown the part 8 in the form of a circular segment, as 8ª, which segment is slidable between lugs or projections which form a circular guide, so that it may slide a short distance either way within this guide. The ends of the segment in this case extend into the cylinder A sufficiently to be alternately struck by the inclines 9 of the inner ends of the pistons B and B', and it is thus tilted or caused to slide in its guides. The valves 5 in this case are connected with the movable part 8ª by connecting-rods 13ª, the operation being in every respect essentially the same as previously described.

Other forms of connection may be employed without materially altering the character of the invention, the object being in any case to so locate the valves that the full pressure of the elastic medium will be carried as close to the cylinder as possible and have as short a distance as possible to traverse before exercising its power upon the piston and to so connect the controlling-valves that they are operated by the direct movement of the piston without exterior connections.

Having thus described my invention, what I claim, and desire to secure by Letters Patent, is—

1. The combination in a rock-drill of a piston and a cylinder in which it is reciprocable, valves located contiguous to the ends of the cylinder, a valve-chamber inclosing said valves, a rocker-arm having portions entering the cylinder and alternately engaged by the piston, and having its ends terminating short of the valves, and connections bridging the space between the ends of the rocker-arm and the valves.

2. The combination in a rock-drill of a cylinder, a piston reciprocating therein and having direct connection with the drill-shank, inlet and exhaust ports connecting with the ends of the cylinder, rotary oscillating valves located between said ports, a valve-chamber within which said valves are contained and with which communication is alternately formed, inclined surfaces formed on the inner ends of the pistons, an oscillating member located within the valve-chamber, and extending into the path of travel of said inclined piston-face and oscillating connections between said member and the valves whereby they are oscillated.

In witness whereof I have hereunto set my hand.

ARTHUR D. FOOTE.

Witnesses:
S. H. NOURSE,
JESSIE C. BRODIE.